United States Patent

[11] 3,552,700

| [72] | Inventor | Wallace F. Mitchell<br>Arlington Heights, Ill. |
|---|---|---|
| [21] | Appl. No. | 759,303 |
| [22] | Filed | Sept. 12, 1968 |
| [45] | Patented | Jan. 5, 1971 |
| [73] | Assignee | Ammco Tools, Inc.<br>Chicago, Ill.<br>a corporation of Illinois |

[54] WHEEL GAUGE ADAPTER
4 Claims, 3 Drawing Figs.

[52] U.S. Cl. .................................................. 248/205,
33/203.18
[51] Int. Cl. ........................................................ G01b 5/255
[50] Field of Search .......................................... 248/205,
226, 201; 33/203.18, 203.19, 203.12, 203.13,
203.14; 81/72; 279/121

[56] References Cited
UNITED STATES PATENTS
2,372,891   4/1945   Fenton ........................(33/203.18UX)

| 2,719,747 | 10/1955 | Layne........................... | 81/72X |
| 2,811,067 | 10/1957 | Greer............................ | 81/72 |
| 3,414,222 | 12/1968 | Alley et al..................... | 248/205X |

Primary Examiner—Edward C. Allen
Assistant Examiner—J. Franklin Foss
Attorney—Fidler, Bradley, Patnaude & Lazo ABSTRACT: A gauge adapter for a wheel includes three symmetrically arranged jaws mounted on arms radiating from a central housing and a manually rotatable knob having thereon a planar mounting surface for the gauge. Each of the arms has a different wedge-shaped cam follower formed onto its inner end. By rotating the knob, a lead screw attached thereto is turned in the central housing to drive a collar that threadedly engages the lead screw and carries a wedge-shaped cam to drive the cam followers and arms outward. The arms are spring-biased inward and the jaws are locked to the arms at any of a plurality of locations to grip the rim of a wheel as the arms are driven outward.

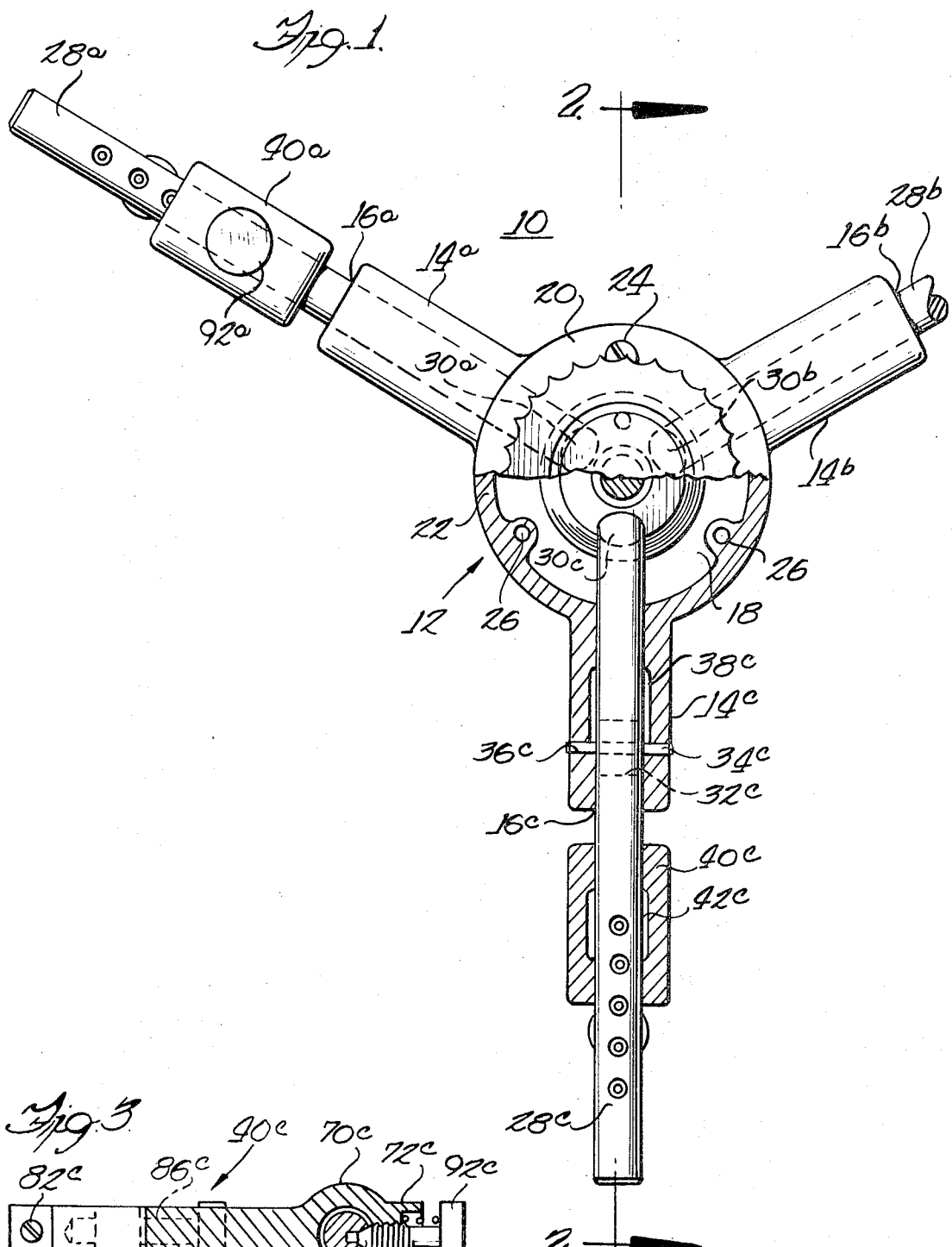
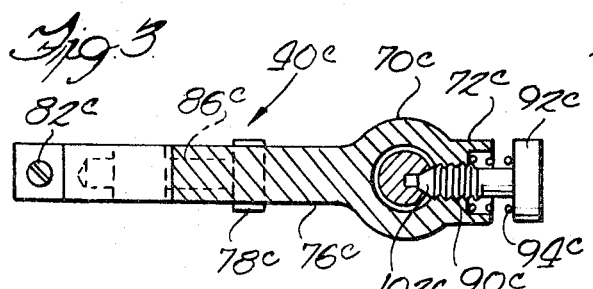

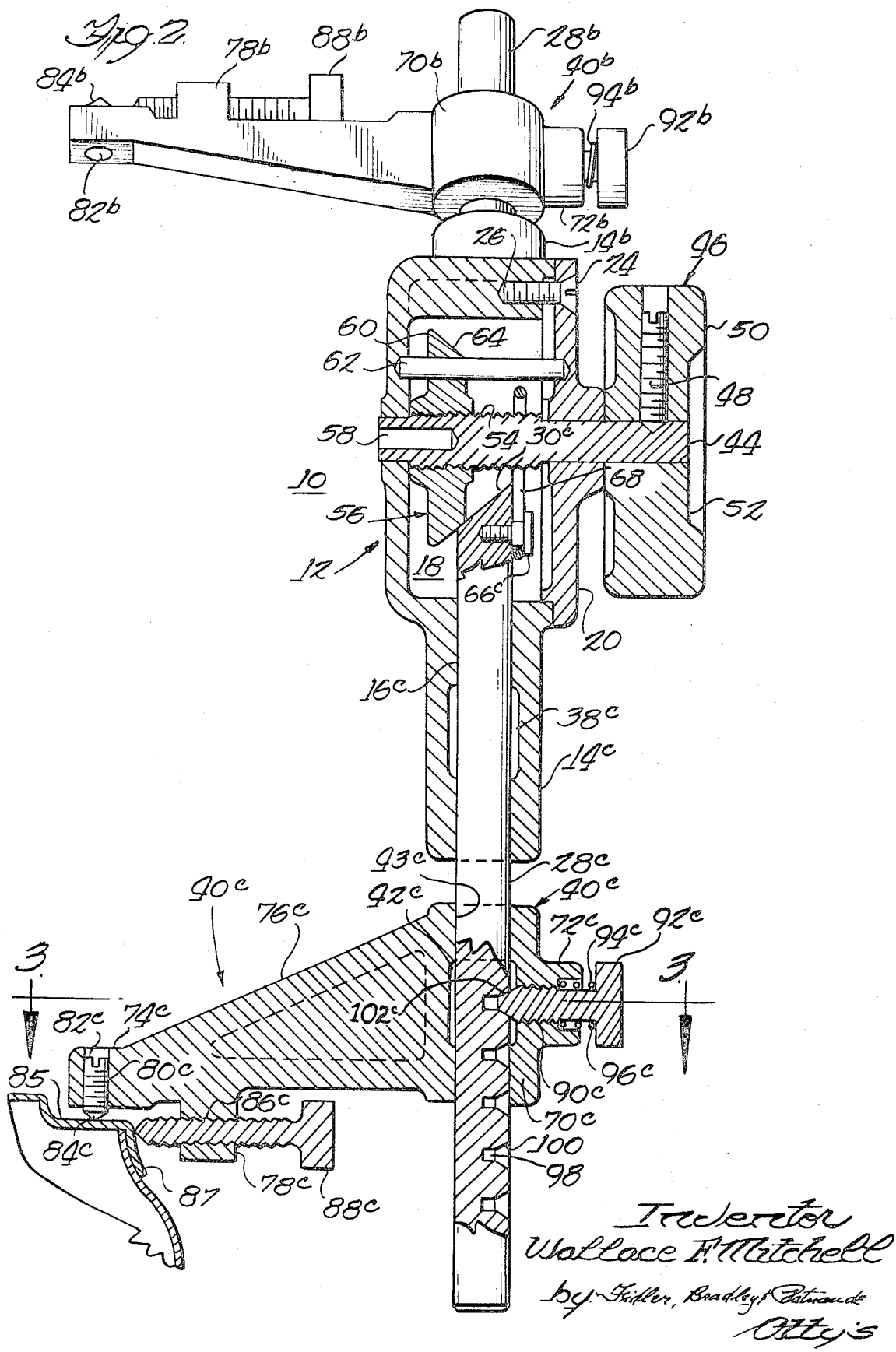

3,552,700

WHEEL GAUGE ADAPTER

This invention relates to adapters for use in attaching equipment to the wheels of vehicles, and it more particularly relates to adapters for attaching service equipment such as, for example, gauges to the wheels of vehicles for use in aligning these wheels.

One type of adapter includes symmetrically arranged jaws mounted on arms radiating from a central housing, which jaws are movable against the rim of a wheel to grip the wheel and thereby support the adapter on the wheel. The central housing includes a manually rotatable knob having a planar mounting surface thereon, which rotatable knob causes the arms to be extended outwardly until the jaws abut and grip the rims of the wheel. The service equipment is magnetically attached to the planar mounting surface.

In the prior art adapters of this type, each of the arms includes a rotatable lead screw that engages internal threads in a bore within its corresponding jaw. The jaw is moved by rotating the lead screw. Bevel gears connect the rotatable knob on the central housing to the rotatable lead screws in each of the arms so that the screws are turned to move the jaws toward or away from the rim of a wheel as the knob is turned.

It is desirable to modify the prior art adapters so that they are more sturdy and less expensive. Moreover, it is desirable to modify the arms, the jaws, and the drive mechanism for the arms so that the jaws grip the rim of a wheel firmly and so that the adapter is held rigidly thereon.

Accordingly, it is an object of the invention to provide an improved adapter for attaching service equipment to a wheel of a vehicle.

It is a further object os of the invention to provide a wheel gauge adapter, which may be easily and quickly placed on a wheel.

It is a still further object of this invention to provide an adapter that is inexpensive and sturdy. It is still further object of this invention to provide an adapter that grips the rim of a wheel firmly and is rigidly held thereon.

In accordance with the above and further objects of the invention, an adapter is provided having a plurality of symmetrically arranged arms radiating from a central housing. Each arm includes a plurality of spaced-apart apertures along its length. A different jaw is mounted on each of the arms, and each jaw includes a plunger adapted to fit into one of the apertures to hold the jaw in place at the selected location.

The central housing includes a manually rotatable knob having a planar mounting surface to which a guage may be magnetically attached. A lead screw is attached to the knob and rotates therewith causing an internally threaded collar mounted on the screw to move axially thereon as the lead screw is turned.

The collar includes a wedge-shaped cam along its outer edge and each arm has attached to it a corresponding wedge-shaped cam follower abutting and engaging the corresponding wedge-shaped cam on the collar so that the cam on the collar moves the radiating arms in an outward direction as the knob is rotated in one direction. The arms are spring-biased inwardly to move the radiating arms inwardly as the knob is rotated in the opposite direction.

The invention and the above noted and other features thereof will be better understood from the following detailed description when considered with reference to the accompanying drawings in which:

FIG. 1 is a fragmentary, rear elevational view, partially in section, of a wheel adapter which is an embodiment of the invention;

FIG. 2 is a sectional view taken along lines 2–2 of FIG. 1; and

FIG. 3 is a sectional view taken along lines 3–3 of FIG. 2.

GENERAL FEATURES

In FIG. 1 a wheel gauge adapter 10, which is an embodiment of the invention is shown in a fragmentary, rear elevational view, partially sectioned, having a cup-shaped housing 12 with three symmetrically arranged radially extending tubular bosses 14a, 14b, and 14c. Each of the three tubular bosses 14a—14 includes a corresponding one of the bores 16a—16c extending therethrough radially into the internal cavity 18 of the housing 12. The cavity 18 is closed by a substantially circular cap 20 which fits over an annular mounting flange 22 of the cup like housing 12 and is secured thereto by means of a plurality of machine screws 24, one of which is partially shown in FIG. 1, which machine screws 24 are received in the tapped holes 26 in the annular flange 22.

Each of three rods 28a—28c extends through a corresponding one of the bores 16a—16c into the cavity 18 of the cup-shaped housing 12 and is terminated therein in one of the angular planar surfaces 30a—30c to form wedge-shaped cam followers as will be hereinafter explained. The rod 28c includes a longitudinally extending slot 32c adapted to receive a pin 34c which is press fitted through an aperture 36c in the boss 14c to restrain axial movements of the rod 28c within a range equal to the length of the slot 32c. Similarly, there are pins (not shown) press fitted into apertures in the bosses 14a and 14b, which pins pass through slots (not shown) in the rods 28a and 28b. Within the range of the lengths of the slots, each of the rods 28a—28c is capable of sliding axially within the bores 16a—16c. Each of the bores 16a—16c also includes an annular groove formed during casting one, 38c, of which is shown in FIGS. 1 and 2.

On each of the rods 28a—28c is a corresponding one of the jaw assemblies 40a—40c, 40a and 40c being shown in FIG. 1 and 40b being shown in FIG. 2. Each of the jaw assemblies 40a—40 includes a corresponding one of the cylindrical bores 43a—43c which receives a corresponding one of the rods 28a—28c. The jaw assemblies 40a—40c also include annular grooves formed during casting, one 42c of which is shown in FIG. 1. The jaw assemblies 40a—40c are slidable along the rods 28a—28c but are normally held in any of several selectable position positions along the rods as will be hereinafter explained.

In the operation of the adapter 10, the jaw assemblies 40a—40c are positioned on their corresponding rods 28a—28c at locations such that a circle having its center at the center of the housing 12 and passing through all three jaw assemblies is slightly larger than the size of the inner shoulder of the rim of the wheel to which the adapter is to be attached. The rods 28a—28 are then moved radially inward in a manner to be hereinafter described until the jaw assemblies 40a—40c lie in a circle slightly smaller than the size of the inner shoulder of the rim of the wheel. The adapter is then positioned with the central housing near the center of the wheel and the rods 28a—40c abut the shoulder of the rim of the wheel to hold the adapter in place. With the adapter in this position a gauge is mounted to it for use in balancing the wheel or performing measurements for any other purpose.

DETAILED STRUCTURE

In FIG. 2 the adapter 10 is shown in a side elevational view, partially sectioned along the lines 2–2 of FIG. 1. This figure shows the structure of the central cuplike housing 12 and the jaws 40b and 40c in greater detail.

As best shown in FIG. 2, the central housing 12 and the cap 20 each include centrally located apertures axially aligned with each other to receive a longitudinally extending lead screw 44. A manually rotatable knob 46 is fastened to the shank of the lead screw 44 and is held in place by means of the radially extending set screw 48.

The knob 46 is preferably formed of ferromagnetic material such for example, as steel. It includes a planar mounting surface 50 and a centrally disposed counterbore 52. Gauges or markers having magnetic mounts are magnetically held against the machined surface 50.

Some types of gauges with magnetic mounts also include an axially extending locating member. An axially extending locating member on such a unit fits into the counterbore 52.

The lead screw 44 includes external threads 54 along its circumference within the chamber 18 of the cuplike housing 12 and an axially extending centerbore 58 opening onto its end in the central aperture of the housing 12. A collar 56 has a central tapped aperture in engagement with the teeth 54 of the lead screw 44 within the chamber 18 and is arranged to be moved axially with respect to the lead screw 44 as the lead screw is rotated by the manual rotation of the knob 46.

The collar 56 includes a radially extending flange 60 having an axially extending aperture therein through which a pin 62 passes. The pin 62 has one end fitted into a bore in the base of the housing 12 and its other end fitted into a bore in the circular cap 20 to support it in an axial direction. The pin 62 permits the threaded collar 56 to move axially along its length but prevents its rotation about the lead screw 44. The edge of the flanges 60 on the collar 56 are tapered to form a wedge-shaped camming surface 64, which camming surface is in engagement with the wedge-shaped cam followers 30a—30c, 30c being shown in FIG. 2.

Each of the rods 28a—28c each include a tapped bore near its corresponding cam follower surface 30a—30c into which a corresponding screw is Each e screw passes through a different coil of the garter spring to hold it against the shaft by its screw head, one such screw 66c being shown in FIG. 2.

In FIGS. 2 and 3 the jaw 40c is shown in position on the rod 28c. It includes a tubular portion 70c having a bore 43c through which the rod 28c extends with an internal bearing surface and an annular groove 42c. A first boss 72c extends from one lateral surface of the tubular portion 70c and a web 76c extends from the diametrically opposite lateral surface of the tubular portion 70c which web supports a second boss 74c. A lug 78c extends from the web 76c in a direction orthogonal to the boss 74c.

The boss 74c includes a threaded bore 80c for receiving a set screw 82c having a hardened metal point 84c. Similarly, a tapped bore 86c is provided in the lug 78c to receive a thumb screw 88c having a hardened metal point. The set screw 82c and the thumb screw 88c are adjusted to form orthogonal contacting surfaces for the rim of a wheel. In a similar manner the jaws 40a and 40b are positioned about the rods 28a and 28b respectively and include corresponding set screws and thumb screws that are adjusted to form orthogonal contacting surfaces for the rim of a wheel.

In a conventional manner, the wheel rim has a cylindrical surface 85 concentric with the axis of the wheel in a plane parallel to the wheel and an annular surface 87 concentric with the axis of the wheel and extending orthogonally from the concentric portions 85. The set screws 82a—82c and the thumb screws 88a—88c of the jaws 40a—40c are adjusted to contact the surfaces 85 and 87 respectively with the set screws 82a—82 holding the adapter tightly in place and the thumb screws 88a—88c serving to adjust the vertical attitude of the adapter.

The boss 72c also includes a tapped bore 90c for receiving the shank of a thumb screw 92c. The thumb screw 92c is biased outwardly by a spring 94c which is seated in the counterbore 96c within the boss 72c. Similarly, the bosses 72c (not shown) and 72b include corresponding thumb screws 92a and 92b. Each of the rods 28a—28c include a plurality of bores 98 spaced along their length with counterbores 100 adapted to receive the points 102a—102c (FIG. 3) of the corresponding thumb screws 92a—92c at any of the plurality of locations to hold the jaws 40a—40c in place.

OPERATION

In use, each of the jaw assemblies 40a—40c of the adapter 10 are moved to a location along the rods 28a—28c that approximately equals the diameter of the inner surfaces of the rim of the wheel, such as for example, 12 inches from the centering bore 58. The jaw assemblies 40a—40c are fixed in place by threading corresponding thumb screws 92a—92c into the selected bores 98. The knob 46 of the adapter is then rotated in a counterclockwise direction until the points 84a—84c of the screws 82a—82c in the jaw assemblies 40a—40c define a circle slightly smaller than that defined by the rim surface 85 of the wheel on which the adapter is to be mounted. The adapter is then placed in position on the wheel with the points 84a—84 of the set screws 82a—82c extending within the rim surface 87 and the knob 44 is rotated clockwise to move the jaw assemblies 40a—40c radially outwardly until the points 84a—84 of the set screws 82a—82c are in clamping engagement with the shoulder 86 of the rim.

Next a suitable gauge such as a spirit level is placed against mounting surface 50 of the adapter. The wheel is rotated and the thumb screws 88c are adjusted to move the adapter relative to the rim surface 87 until rotation of the wheel has no effect on the position of the bubble in the level. After this has been accomplished, the mounting surface 50 lies in a plane parallel to the plane of rotation of the wheel and whatever gauge or reference device is mounted thereon is accurately positioned relative to the plane of rotation of the wheel.

It can be understood that the jaws 40a—40c are held tightly in place by the thumb screws 92a—92c. The holding arrangement that includes the bores 98 and the thumb screws 92a—92c is sturdy and does not flex from the force applied to the jaws 40a—40c when the knob 46 is turned clockwise to tighten the jaw assemblies against the rim of a wheel. Moreover, the entire apparatus is sturdy and inexpensive. The rods 28a—28c are moved outwardly by a simple camming and lead screw arrangement and without the need for beveled gears.

While an embodiment of the invention has been described with a certain degree of particularity, many modifications and variations may be made in the embodiment without deviating from the invention. It is therefore to be understood that, within the scope of the appended claims, the invention may be practiced otherwise than as specifically described.

I claim:

1. An adapter assembly for attachment to a wheel to provide a mounting surface for service equipment, comprising:
    a housing on which said mounting surface is disposed;
    a plurality of arms movably secured to and extending radially from said housing;
    a plurality of wheel engaging jaws respectively mounted on said arms;
    each of said jaws having a fixed wheel-engaging surface thereon;
    each of said arms including a different cam follower surface;
    each housing including at least one cam for engaging said cam follower surfaces;
    means movably mounted to said housing for moving said cam along said cam follower surfaces to move said arms such that said wheel engaging surfaces come into mutual abutment with said wheel;
    said cam being part of a collar having a threaded aperture;
    said means for moving said cam including a lead screw threadly engaging said aperture, whereby said cam is moved with respect to said cam followers as said lead screw is rotated;
    each of said arms including a plurality of radial apertures arranged in a row extending laterally along a length of said arms;
    said jaws each including a means for engaging with a selected one of said apertures along its corresponding arm to fasten said jaw to said arm;
    said means movably connected to said housing for moving said cam including a rotatable knob to which said lead screw is attached to rotate therewith;
    each of said jaws having mounted thereon an adjustable wheel engaging surface disposed orthogonally to the associated one of said fixed wheel engaging surfaces, whereby said adjustable wheel engaging surfaces are independently movable to orient said mounting surface parallel to the plane of rotation of said wheel;

said mounting surface being disposed on said rotatable knob and being a plane surface on a rigid, ferromagnetic member;

said cam having a wedge-shaped edge with a bore extending therethrough parallel to the axis of said threaded aperture;

said housing further including a pin extending through said aperture in said cylindrical collar and being fixed to said housing parallel to said lead screw whereby said collar is restrained from rotating with said lead screw;

said cam followers including a complementary formed wedge-shaped surface abutting said wedge-shaped edge of said cam; and said adapter assembly further including a spring attached to said arms to bias said arms inwardly, whereby said cam surfaces force said arms outwardly and permit said arms to be pulled inwardly by said spring.

2. An adapter assembly for attachment to a wheel to provide a mounting surface for service equipment, comprising:

a housing on which said mounting surface is disposed;

a plurality of elongated arms movable secured to and extending radially from said housing;

a plurality of wheel engaging jaws respectively mounted on said arms;

each of said jaws having a fixed wheel engaging surface thereon;

each of said arms including a different cam follower surface;

said housing including a collar having a centrally located threaded aperture and a wedge-shaped edge forming a cam in engagement with the cam follower surfaces of each of said arms and having a bore extending therethrough parallel to the axis of the threaded aperture and offset therefrom;

said housing further including a pin extending through said bore and being fixed to said housing parallel to said threaded aperture;

said housing further including a lead screw threadly engaging said aperture;

said lead screw being rotatably fastened to one end of said housing and extending from the other end of said housing; and a manually rotatable knob fastened to the other end of said lead screw, whereby rotation of said knob rotates said lead screw such that said cam is moved with respect to said cam followers.

3. An adapter assembly according to claim 2 further including spring means attached to said lead screw and said arms for biasing said arms inwardly, whereby said cam surfaces force said arms outwardly and permit said arms to be pulled inwardly by said spring means.

4. An adapter assembly according to claim 2 in which each of said arms includes a plurality of apertures arranged in a row extending laterally along a length of said arms and each of said jaws includes a spring-biased detent for engaging a selected one of said apertures along its corresponding arm to fasten said jaw to said arm.